United States Patent [19]

Leale

[11] 4,417,181

[45] Nov. 22, 1983

[54] ELECTRONIC BALLAST

[75] Inventor: Luis Leale, San Diego, Calif.

[73] Assignee: Sonelt Corporation, San Diego, Calif.

[21] Appl. No.: 159,903

[22] Filed: Jun. 23, 1980

Related U.S. Application Data

[63] Continuation-in-part of Ser. No. 55,239, Jul. 6, 1979, abandoned.

[51] Int. Cl.³ ............... H05B 37/02; H05B 39/04; H05B 41/36
[52] U.S. Cl. .................. 315/209 R; 315/DIG. 5; 315/DIG. 7; 315/DIG. 2; 315/277; 315/205; 331/113 A
[58] Field of Search ............... 315/DIG. 2, DIG. 5, 315/DIG. 7, 277, 205, 206, 207, 209; 331/113 A

[56] References Cited

U.S. PATENT DOCUMENTS

| | | | |
|---|---|---|---|
| 3,829,794 | 8/1974 | Gautherin | 331/113 A |
| 3,911,320 | 10/1975 | Crawford et al. | 315/DIG. 5 |
| 4,006,384 | 2/1977 | Elms et al. | 315/DIG. 5 |
| 4,017,780 | 4/1977 | Cowett, Jr. | 331/113 A |
| 4,029,993 | 6/1977 | Alley et al. | 315/DIG. 5 |
| 4,127,798 | 11/1978 | Anderson | 315/DIG. 5 |
| 4,185,233 | 1/1980 | Riesland et al. | 315/DIG. 5 |
| 4,188,661 | 2/1980 | Bower et al. | 315/DIG. 5 |
| 4,237,403 | 12/1980 | Davis | 315/DIG. 7 |
| 4,259,616 | 3/1981 | Smith | 331/113 A |
| 4,260,932 | 4/1981 | Johnson | 315/DIG. 5 |
| 4,339,690 | 7/1982 | Regan et al. | 315/DIG. 5 |

*Primary Examiner*—Saxfield Chatmon

[57] ABSTRACT

An electronic ballast employs an electronic inverter which drives a main power transformer across the output of which terminations are connected for a plurality of fluorescent lamps. A high impedance capacitor is connected in parallel across at least one and less than all of the fluorescent lamps. An auxiliary transformer is interposed between the output of the main power transformer and the cathode elements of the fluorescent lamps. Upon start-up, the high impedance capacitor initially creates a bypass around lamps with which it is connected in parallel to thereby apply the entire high voltage output of the power transformer to start the remaining lamps. Once these lamps are started the voltage drop thereacross is reduced to allow the high voltage output to bypass the high impedance capacitor and start the lamps connected in parallel therewith. The auxiliary transformer provides good magnetic coupling and low voltage to the cathode elements of the fluorescent lamps. A separate feedback transformer smaller than the main power transformer operates the electronic inverter to avoid operation of the main power transformer at its saturation limits.

12 Claims, 17 Drawing Figures

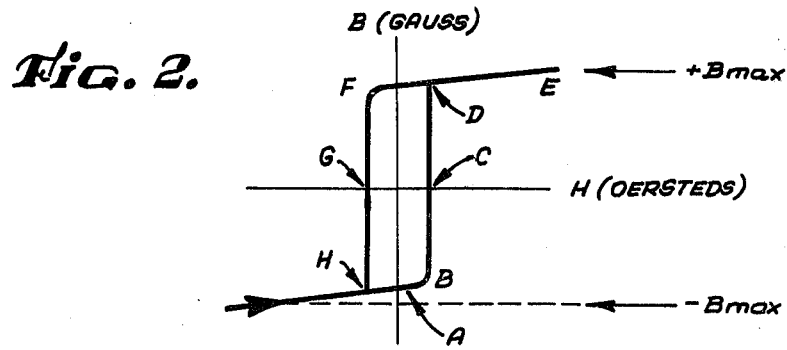
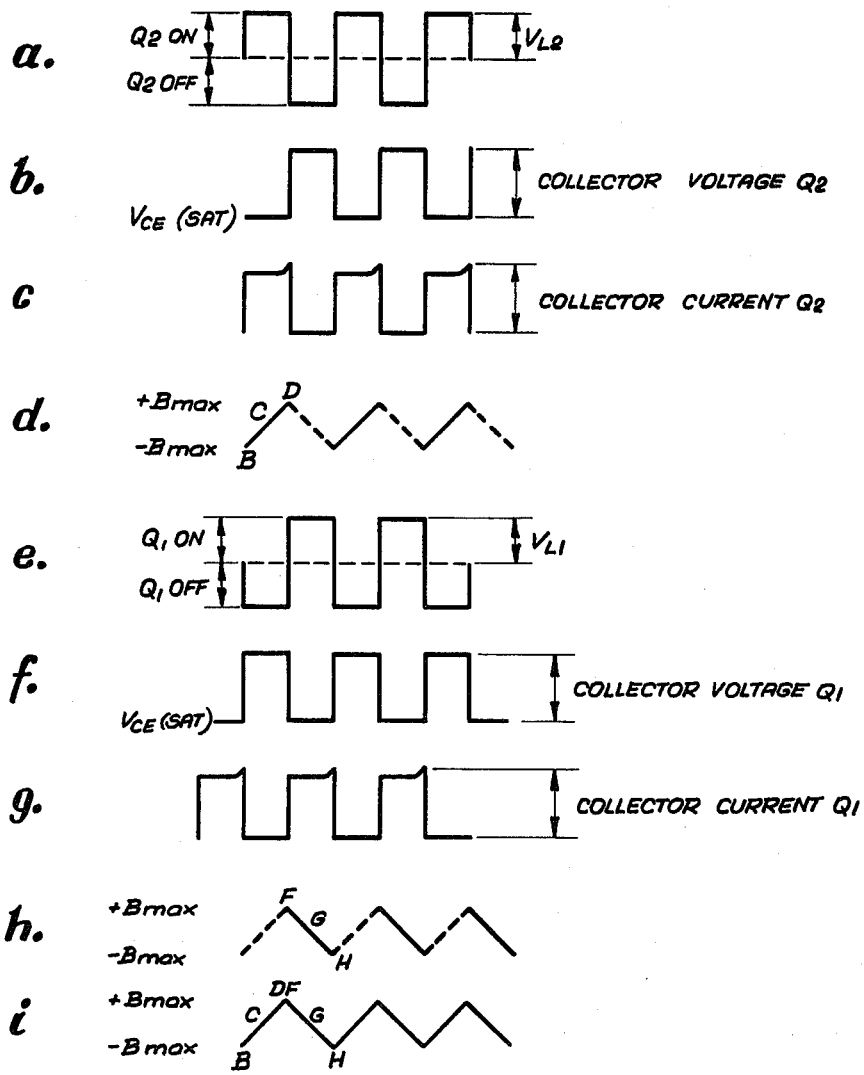

ELECTRONIC BALLAST

BACKGROUND OF THE INVENTION

This is a continuation-in-part of U.S. application Ser. No. 55,239, filed July 6, 1979, now abandoned.

FIELD OF THE INVENTION

The present invention relates to electronic ballasts for electrical discharge lamps.

DESCRIPTION OF THE PRIOR ART

There are a wide variety of different electrical discharge lamps which use metallic vapor in a gaseous atmosphere for purposes of illumination. Among the various lamps of this type available are fluorescent lamps, luminescent lamps, mercury arc lamps, sodium vapor lamps, xenon lamps, etc. All of these lamps have different functioning characteristics in specific respects, but all of them function on similar principles.

Until now, there have been two types of ballasts commercially available for use with electrical discharge lamps. The older type of ballast operates exclusively on the principle of transference and control of power by means of electro-magnetic currents. The older type of ballast can be used for operating the different electrical discharge lamps enumerated above. The more recently developed electronic ballasts, on the other hand, have heretofore exhibited certain basic deficiencies and have been heretofore been adaptable only to lamps of small power consumption. Moreover, electronic ballasts heretofore developed have supplied only low voltage power.

Ballasts which are presently commercially available have exhibited relatively low efficiency in power transference. Accordingly, it is an object of the present invention to obtain a predetermined luminosity with a power consumption that is substantially reduced from that exhibited by commercially available electrical discharge lamps utilizing conventional ballasts. The present invention provides a ballast which both supplies a high ignition voltage and also a lower maintenance or operating voltage, which are appropriate for use with electric discharge lamps.

Another disadvantage of the ballast that have heretofore been available is that such ballasts typically operate at the frequency with which power is supplied from public utility companies; i.e. 60 or 50 hertz, for the most part. Such operation causes the electrical discharge lamps with which they are used to exhibit a stroboscopic effect and noise to varying degrees. For example, fluorescent bulbs of a 96 inch length are presently commercially available and are among the bulbs which are most economically operated from a 110–120 volt 60 cycle alternating current power supply. However, these bulbs are normally unsuitable for use in most commercial offices because of the high buzz which they exhibit. It is an object of the present invention to provide a ballast which causes fluorescent fixtures of this and other types to operate with practically no sound.

Another object of the invention is to provide an electronic ballast which has only a fraction of the weight of conventional ballast. The use of the conventional transference ballasts requires heavy ferromagnetic cores and wires which has required that building ceilings must be equipped with substantial T-bar types of false ceiling frames to support the weight of lights employing conventional ballasts. Utilizing the present invention, however, a simple solid state electronic ballast is provided which is able to use light weight transformers. This reduces the structural requirement for the T-bar supports and allows considerable savings in costs in the construction of such supports.

A further advantage of the electronic ballast of the present invention is that it is far more efficient in operation than conventional ballasts, and substantially more efficient than even the most advanced electronic ballasts heretofore developed. Specifically, the ballast of the present invention provides a given number of lumens from commercially available fluorescent bulbs while consuming only 60 percent of the power required to provide the same luminosity with a conventional electromagnetic ballast. The most advanced electronic ballasts heretofore available have claimed only a 20 percent energy savings and are considerably more complex and costly than the ballast of the present invention.

Yet a further feature of the electronic ballast of the present invention is that because of the high efficiency in operation, very little heat is generated from the ballast itself, and the fluorescent lamps with which the ballast of the invention is used likewise operate more efficiently since power can be supplied thereto much more nearly in accordance with the manufacturer's specifications for commercially available bulbs, as contrasted with prior devices. As a result, fluorescent fixtures utilizing the electronic ballast of the invention produce far less wasted heat, and therefore minimize the cooling level required in air conditioned commercial buildings employing fixtures utilizing ballasts according to the invention.

A further feature of the present invention is that power is provided to commercially available bulbs at a current level, operating voltage, starting voltage, preheating current and cathode heater voltage quite close to the manufacturer's specifications. As a consequence, bulbs last longer utilizing ballasts according to the invention, and the ballast themselves do not exhibit the high failure rate characteristic of more inefficient ballasts in which considerable heat is produced.

Electronic ballasts heretofore employed have utilized inverters, or oscillator circuits to alternately pulse the primary of a main power transformer in first one direction and then the other. Electronic ballast heretofore available have typically failed to provide appropriate coupling between the inverter circuitry and the lamps to be illuminated, thereby failing to conform to the technical specifications of such lamps. One of the essential characteristics of fluorescent lamps, as in all electrical discharge lamps, is the requirement for a starting voltage which is considerably larger than the operating voltage. Solid state inverter ballasts of the type heretofore available have not had the ability to conform to the technical requirements by reducing the necessary and recommended operating voltage drop across each of the lamps once the lamps are started. More specifically, the output transformer keeps on delivering to the lamps the same voltage used to start them, which is larger than the operating voltage. This causes two serious problems which effect ballast efficiency.

In the first place, the lamps are operated with a voltage which exceeds the manufacturer's suggested operating voltage. This results in a more rapid deterioration of the cathodes of the lamps which blackens the ends thereof and reduces lamp life. In the second place, operation of the lamps at an unnecessarily high voltage causes an increase in the impedance reflected onto the primary winding. It is well known that the reflected impedance in a transformer is directly proportional to the square of the turns ratio from the secondary winding to the primary winding. That is, $$Z_r = Z_l(N_s^2/N_p^2)$$

where $Z_r$ is the reflected impedance, $Z_l$ is the load impedance, $N_s$ is the number of turns of the secondary winding, and $N_p$ is the number of turns of the primary winding.

In a power transformer in which a relatively high voltage output is produced, a relatively large number of turns in the secondary winding are required, as compared with lower voltage output transformers. Since the reflected impedance is a quadratic function of the turns ratio, a voltage which is unnecessarily large to even a relatively small degree exhibits a dramatic increase in inverter inefficiency.

Another serious problem of solid state inverter ballasts heretofore available is that filament feeding is either omitted, or even in the best case, is entirely inadequate. The lack of filament feeding for the cathode heated lamps means that a inordinately high voltage must be applied to start the lamps. This aggravates all of the problems associated with high voltage operation of electric discharge lamps as heretofore described. In prior electronic ballasts, any filament feeding is provided from windings on the output transformer. In the ferrite core used in the output transformer, the primary voltage applied to the main power transformer is always well in excess of three volts. As a result, with conventional electronic ballasts only a single turn or a fraction of a turn are provided to effectuate filament feedings at a relatively low voltage, as is required according to the manufacturer's specifications. However, it is well known that it is necessary to have at least three turns on a transformer to obtain good magnetic coupling. Despite this, in conventional electronic ballast systems only a single secondary turn, or a fraction of a turn, is provided in association with the main power transformer to derive a current to feed the cathodes of the electrical discharge lamps. As a result, the current provided to the cathode elements fluctuates considerably, because of poor magnetic coupling, and frequently departs signficantly from the manufacturer's recommended cathode heater nominal voltage. This voltage is typically from about 3.6 to about 7.5 volts. The cathode feeding in previous electronic ballast systems is therefore quite inefficient.

In the present invention, on the other hand, an efficient cathode feeding system for electrical discharge lamps is provided by employing an auxiliary transformer, interposed between the main power transformer and the cathode elements. This achieves good magnetic coupling without overdriving the cathode elements.

SUMMARY OF THE INVENTION

The present invention is an electronic ballast which provides an output adequate to meet the required electrical characteristics of electrical discharge lamps, including fluorescent lamps, according to the manufacturer's specifications. A principal feature of the invention is a circuit arrangement which allows the high voltage of the main power transformer secondary to be provided sequentially to electrical discharge lamps coupled thereto, but to thereafter drive the lamps through a series connection at the lower operating voltage required. In addition, the electronic ballast of the invention provides an efficient cathode feeding system to the cathode element of the lamps by the interposition of an auxiliary transformer between the cathode elements and the main power transformer. This allows good magnetic coupling without overdriving the cathode elements.

A further feature of the invention is the use of a feedback transformer in order to drive the inverter. The use of the feedback transformer of the invention allows the electronic ballast to function at high frequency to thereby eliminate noise, reduce power consumption and achieve a weight reduction as contrasted with ballasts that operate based upon an electromagnetic transference of voltage. The weight reduction is almost two thirds, compared to such conventional ballasts, and the transportation, storage, handling and installation of the electronic ballasts in accordance with the invention is far easier.

Another advantage in using a feedback transformer in an electronic ballast is that the main power transformer can be operated well within its saturation limits. Indeed, it is preferable to operate the main power transformer over only about one half of the flux range to maximize efficiency of operation. This serves to reduce component failure by eliminating spikes in current flow in the transistors in the inverter circuit.

Another feature of the invention is that the novel electronic ballast is highly versatile. That is, the preferred embodiment of the invention may be used to operate all of the types of fluorescent lamps which are presently commercially manufactured for use all commercially available voltages, including 110–120 volts, 208 volts, 277 volts, and other voltages operating at 60 hertz alternating current. Furthermore, the electronic ballast of the invention can control luminous intensity of a multiplicity of lamps with an internal circuit that does not increase the size of the ballast, nor the cost of operation thereof.

BRIEF DESCRIPTION OF THE DRAWINGS

FIG. 2 illustrates the hysteresis loop of the feedback transformer of the embodiment of FIG. 1.

FIGS. 3(a)–3(i) illustrate several waveforms useful in explaining the operation of the invention.

DETAILED DESCRIPTION OF THE EMBODIMENTS

Figure 1:
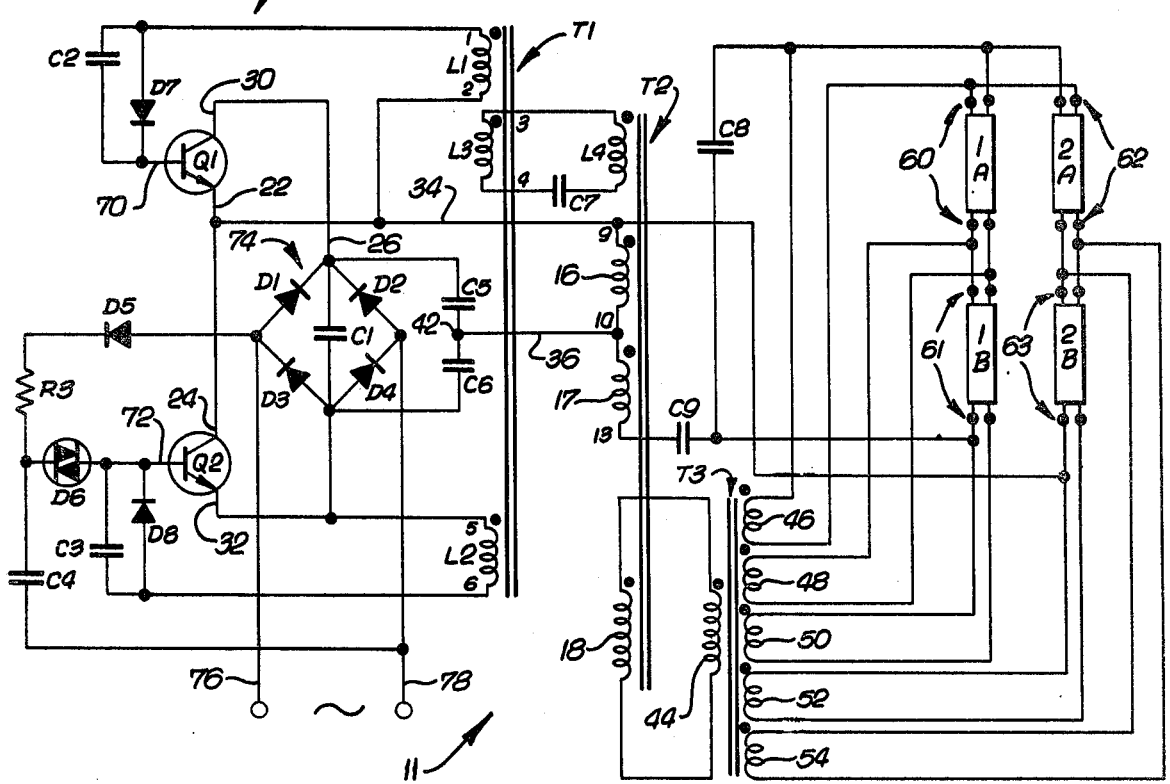
FIG. 1 is a schematic diagram of the preferred embodiment of the present invention.

FIG. 1 illustrates a solid state electronic ballasting system 11 for illuminating electrical discharge lamps 1A, 1B, 2A and 2B, which may be commercially available 40 watt fluorescent bulbs. The lamps are located within a plurality of lamp terminals, indicated at 60–63. The ballasting system 11 employs a main power transformer T2 having a primary winding 16, a first secondary winding 17 and a second secondary winding 18. The ballasting system 11 also employs an electronic inverter 20 having a starting circuit employing a diac D6. An operating capacitor C9 is connected to one end of the main power transformer secondary winding 17. The fluorescent terminals 60–63 are series connected to the operating capacitor C9 and the main power transformer secondary winding 17. A high impedance capacitor C8 is connected in parallel across at least one and less than all of the fluorescent terminals 60–63. Specifically, the capacitor C8 is connected in parallel with the lamps 1A and 1B. An auxiliary transformer T3 has a primary winding 44 coupled to the second secondary winding 18 of the main power transformer T2 and is stepped down therefrom. Secondary windings 46–54 are stepped down from the primary winding 44 of the auxiliary transformer T3 and coupled to the flourescent terminals 60–63 for heating cathode elements in the fluorescent lamps 1A, 1B, 2A and 2B.

The inverter circuit 20 has a first transistor Q1 and a second transistor Q2 with the emitter 22 of the first transistor coupled to the collector 24 of the second transistor. A pair of d.c. supply lines 26 and 28 are coupled, respectively, to the collector 30 of the first transistor Q1 and to the emitter 32 of the second transistor Q2. A pair of charging capacitors C5 and C6 are series connected across the d.c. supply lines 26 and 28. Each of the capacitors C5 and C6 is coupled to at least partially turn on a single one of the transistors at the beginning of each half cycle. That is, the capacitor C5 is used to partially turn on the transistor Q1 and the capacitor C6 partially turns on the transistor Q2. A lead 34 connects the emitter 22 of the first transistor Q1 to the main power transformer primary winding 16, and a lead 36 is connected to the other end of the primary winding 16 and to the secondary 17 of the main power transformer T2. The lead 36 is coupled to a tap 42 between the charging capacitor C5 and C6.

Some means is provided for driving the transistors Q1 and Q2 in alternating sequence. This function is performed by the feedback transformer T1 and by a secondary winding L4 on the main power transformer T2. The feedback transformer T1 is interposed between the inverter 20 and the main power transformer T2 to drive the inverter 20 to produce oscillating pulses to the primary winding 16 of the main power transformer T2. The feedback transformer T1 has a primary winding L3 and two output secondary windings L1 and L2. The primary winding L3 is coupled in a loop to a third secondary winding L4 of the main power transformer T2 through a capacitor C7. If desired, an adjustable potentimeter may be provided in place of the capacitor C7 to vary the frequency of power transfer to the main power transformer T2 by varying the duration of each feedback cycle. Consequently the luminous intensity of the lamps 1A, 1B, 2A, and 2B can be adjusted in this fashion if desired.

In the embodiment of the invention depicted in FIG. 1, the feedback transformer T1 has dual secondary output windings L1 and L2, each respectively connected in circuit between the emitter and the base of one of the transistors Q1 and Q2, as depicted. A diode D7 and a capacitor C2 are connected in parallel to the base 70 of transistor Q1 and to one lead of the secondary winding L1 of the feedback transformer T1. Similarly, a diode D8 and a capacitor C3 are connected in parallel to the base 72 of the transistor Q2 from one lead from the secondary winding L2 of the feedback transformer T1. In this way the feedback transformer secondary winding L1 is coupled to the base 70 of the transistor Q1 while the feedback transformer secondary winding L2 is coupled to the base 72 of the transistor Q2.

A full wave rectifying bridge 74 employing diodes D1–D4 and a filtering capacitor C1 are coupled to 120 volt, 60 hertz a.c. supply lines 76 and 78. A line 80 is connected through a diode D5 and through a resistor R3 to the diac D6. The diac D6 serves as the active element of a starting circuit and is connected between the line 80 and the base 72 of transistor Q2. A diac threshold capacitor C4 is coupled between the diac D6 and the a.c. supply line 78.

The operation of the embodiment of FIG. 1 can be explained with reference to the hysteresis loop of FIG. 2 and the waveforms of FIGS. 3(a)–3(i) and the equivalent circuit diagrams of FIGS. 4(a)–4(d). In the explanation of operation, references to direction of electron flow are the directions in which electrons actually flow in the system, in contradistinction to the conventional direction of current flow, which is just the opposite of electron flow. Also, the dot orientation of the transformer winding elements is indictive of a commonality of polarity of the ends of the transformer windings at any given time.

In the circuit of FIG. 1, the starting circuit is formed by the resistor R3, the charging capacitor C4 and the bilateral triggering diac D6. The diac D6 allows the easy ignition of the ballasting system 10 at any condition of temperature and charge. When the ballasting system 10 is energized through the full wave rectifier 74, capacitor C4 is charged. When capacitor C4 has reached the break down voltage of the triggering diac D6, the diac D6 becomes a conductor and produces a current spike which is applied to the base 72 of transistor Q2. This begins the regenerative oscillation of the inverter circuit 20.

The current spike from the diac D6 turns the transistor Q2 on in a condition of saturation. The transistor Q2 is initially supplied with current by the bridge rectifier 74, and capacitor filter C1. There is an electron flow from the collector 24 of transistor Q2 to the line 34 leading to the primary 16 of the main power transformer T2. Electron flow is through the primary winding 16 of the main power transformer T2 from end 9 to end 10 and through line 36 to the tap 42 between capacitors C5 and C6. From there the electron flow is from the capacitor C6 to the line 28 and then to the emitter 32 of transistor Q2. An electron flow also occurs from the emitter 32 of transistor Q2 through the diode D8 and from the end 6 to the end 5 of secondary winding L2 of the feedback transformer T1. At the same time, there is an electron flow from line 34 and from the end 2 to the end 1 of the feedback transformer T1 to provide a reverse bias to the transistor Q1.

The voltage at the collector 24 of transistor Q2 is a square pulse, as illustrated in FIG. 3(b). The current flowing from the collector 24 of transistor Q2 is 180° out of phase with the collector voltage, as illustrated in FIG. 3(c). The flow of current from the collector 24 of the transistor Q2 is held on for the balance of the first half cycle by the positive voltage induced in the secondary winding L2 of feedback transformer T1 by the saturation of transformer T1 as depicted in FIG. 3(a). An opposite polarity voltage is induced in the secondary L1 of the feedback transformer T1 during the transistor Q2 "on" time, as depicted in FIG. 3(e). The voltage in secondary winding L1 holds transistor Q1 off during the transistor Q2 "on" time.

During the transistor Q2 "on" time, the voltage impressed on the primary winding 16 of the main power transformer T2 is almost half of the power source voltage, because of the capacitive voltage divider formed by the capacitors C5 and C6. The voltage on the transformer primary winding 16 of the main power transformer T2 feeds power to the lamp terminals 60-63 through the first secondary winding 17 on the main power transformer T2. Sufficient power is maintained to the base 72 of transistor Q2 by the induced voltage in the secondary winding L2 of the feedback transformer T1 to keep the transistor Q2 "on" and in saturation at a current level equal to the sum of the secondary load lamp current that is reflected back into the primary winding L3 of the feedback transformer T1. As can be seen from the dot notation of the secondary windings L1 and L2 of the feedback transformer T1, if the transistor Q2 is "on" and in saturation and the end 6 of winding L2 is positive relative to the end 5, current can flow through the diode D8 so that the base 72 of the transistor Q2 is forward biased to maintain the transistor Q2 on. At the same time, the end 2 of the secondary winding L1 of the feedback transformer T1 is always positive relative to the end 1, so that there is no current flow through the diode D7 as long as the transistor Q2 is driven on. Consequently, while the transistor Q2 conducts, the transistor Q1 is held "off". The contrary is also true.

The transistor Q2 remains on as long as there is a voltage induced in the secondary winding L2 of the feedback transformer T1 by means of the coupling to the primary L3 of the feedback transformer T1. The "on" time of the transistor Q2 is fixed by the transformer T1 and feedback voltage from the secondary winding L4 of the main power transformer T2. This time is determined in accordance with the fundamental magnetic relationship: $V_{L4}=N_{L3} \cdot A_c (dB/dt)$, where $v_{L3}$ is the instantaneous primary voltage of feedback transformer T1 in volts, $N_{L3}$ is the number of primary turns of feedback transformer T1, $A_C$ is the feedback transformer cross sectional core area in square centimeters, and $dB/dt$ is the instantaneous rate of change of magnetic flux density in gauss per second.

As long as the transistor Q2 is in saturation, there is a constant voltage across the winding L3 and the fundamental magnetic relationship dictates a constant $dB/dt$. The flux changes in the feedback transformer T1 are illustrated in FIG. 2. Thus, if the transformer core starts, for example, at point B in FIG. 2 which is $-B_{max}$ on the hysteresis loop, the flux increases linearly along the path BCD in FIG. 2 at a rate given by $$dB/dt = V_{L3}/N_{L3} \cdot A_C.$$

The loci of flux with respect to time is shown in FIG. 3(d) which is a plot of core flux density. When the flux reaches $+B_{max}$, which occurs at point E in FIG. 2, $dB/dt$ drops to zero. At this time there can be no voltage across the primary winding L3 of the feedback transformer T1. There can therefore be no voltage across the secondary windings L1 and L2 of feedback transformer T1. In other words, at $+B_{max}$ the slope of the hysteresis loop or core permeability, and hence, the primary impedance of the transformer T1, have fallen to zero.

Once the voltage across the primary winding L3 of the feedback transformer T1 falls to zero, so does the voltage across the secondary winding L2 of the feedback transformer T1. This removes the bias voltage into the base 72 of the transistor Q2, so that that transistor Q2 turns off. The voltage at the collector 24 of transistor Q2 is forced upward by the source power voltage. FIG. 3(a) shows the base voltage of the transistor Q2, while FIG. 3(b) shows the collector-emitter voltage for the transistor Q2. FIG. 3(c) shows the collector current for the transistor Q2 and FIG. 3(d) shows the flux loci during the time the transistor Q2 is on, all for the first half of each cycle of operation of the inverter 20.

In the first half cycle of operation, the capacitor C6 loses its charge. Once the voltage across the feedback transformer T1 collapses, an imbalance in charge exists between the capacitors C5 and C6. That is, the capacitor C5 has more charge. The charge on the capacitor C5 then turns the transistor Q1 partially on. Because of the direction of the winding of the secondary L1 of the feedback transformer T1, this represents a negative coercive force. The core operating point in the hysteresis curve of FIG. 2 moves along the hysteresis loop in the path FGH. As current is induced it increase in the negative coercive force direction. The core of the feedback transformer T1 again is in a region of high permeability and voltage can be sustained across the winding L1 with the end 2 negative relative to the end 1.

With a high impedance in the collector 30 of the transistor Q1, the collector 30 starts to fall in potential as current to the emitter 22 increases. This produces a voltage across the primary winding 16 of the main power transformer T2 and an electron flow from end 10 to end 9 thereof. This produces feedback through the feedback transformer T1 to provide additional drive to the base of transistor Q1 beyond that provided through the diode D7. As a result, the collector 30 of the transistor Q1 is driven negative even more rapidly. This process continues regeneratively so that the collector 30 of the transistor Q1 is driven into saturation. Thereafter, the flux in the core of the feedback transformer T1 moves downward along the path of the hysteresis loop of FIG. 2, and at $-B_{max}$, the base drive to the base 70 of the transistor Q1 collapses as the transformer core of transformer T1 saturates in the negative direction. At this time, Q2 is partially turned on by the imbalance between the charges on the capacitor C5 and C6. Thereafter, there is a full regenerative turn on of transistor Q2 until transistor Q2 is again saturated. That is, the condition of the core advances along the path BCD in the hysteresis loop of FIG. 2 again.

FIG. 3(e) shows the base voltage of the transistor Q1. FIG. 3(f) shows the collector-emitter voltage of the transistor Q1, while FIG. 3(g) shows the collector current of transistor Q1. FIG. 3(h) shows the flux loci during the time the transistor Q1 is turned on. FIG. 3(i) shows the flux loci during the entire cycle.

The process of oscillation of the inverter 20 produces an alternating current through the primary 16 of the main power transformer T2 with the feedback transformer T1 moving cyclically over its entire hysteresis loop from $-B_{max}$ to $+B_{max}$ on one half cycle, and then from $+B_{max}$ to $-B_{max}$ on the next half cycle.

A significant advantage of the multiple transformer design of the embodiment of the invention depicted in FIG. 1 is apparent with reference to FIGS. 3(c) and 3(g). These collector current waveforms should be considered with reference to a disadvantageous feature of conventional electronic ballasting system that have but a single transformer. In such conventional ballasting systems, a fundamental part of the design permits the tranformer core to saturate momentarily at the end of each conducting half cycle. This fixes the end of each half cycle. At the instant of saturation, the transformer primary impedance suddenly drops to zero, causing a steep rise in collector current. Although core saturation greatly reduces the collector to base winding coupling and removes the base drive, the "on" collector remains partly on until the stored base charge is fully swept out. There is thus a low impedance path directly from the bridge rectifier or d.c. power source through the saturated primary and the collector of the "off" transistor that is turning off slowly.

The collector current spike at the end of each conducting half cycle may be many times the value just prior to core saturation in conventional single transformer ballasting systems. Although it occurs mostly at the low collector to emitter saturation voltage, the collector current spike persists during the slowly rising collector voltage at the end of the storage time. This results in a spike of transistor power dissipation, which can be a significant fraction of the entire power dissipation. For sufficiently long storage and turn off times, and a high duty cycle resulting from high frequency operation, this collector current spike can cause transistor failure. In contrast, in the multiple transformer square wave oscillator system, such as that depicted in FIG. 1, there is only a minor collector current spike, as depicted in FIGS. 3(c) and 3(g).

Once the ballasting system 11 is turned on, the cathode elements of the lamps 1A, 1B, 2A and 2b are first heated by means of the auxiliary transformer T3 to help start the lamps by reducing the demand of the starting voltage. In the main power transformer T2, voltage in the primary 16 is doubled in the secondary 17. When the ballasting system 11 is initially turned on, the main power transformer turns on the lamps 1A, 1B and 2A, 2B, two at a time. After the lamps are turned on, they operate in series.

Figure 4A:
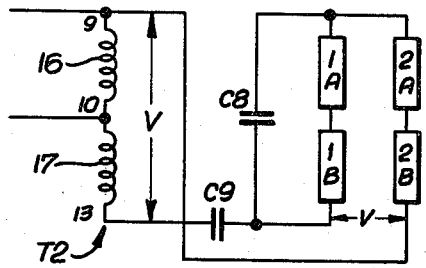
FIGS. 4(a)–4(d) illustrate several equivalent circuits useful in explaining the operation of the invention.

The high impedance capacitor C8 is coupled in parallel with the lamps 1A and 1B as depicted in FIG. 1, and also as depicted in the equivalent circuit of FIG. 4(a). This connection aids in turning on the lamps 2A and 2B. FIG. 4(a) illustrates the driving circuit for the lamps 1A, 1B, 2A and 2B in simplified form without illustrating the circuitry for cathode feeding. As illustrated, momentarily almost all of the secondary voltage of the main power transformer T2 is applied across the lamps 2a and 2b when the system is first turned on. Before the lamps 2A and 2B are started, the equivalent circuit is as depicted in FIG. 4(b) with an open circuit condition existing both across the series connected lamps 1A and 1B and across the series connected lamps 2A and 2B.

Figure 4C:
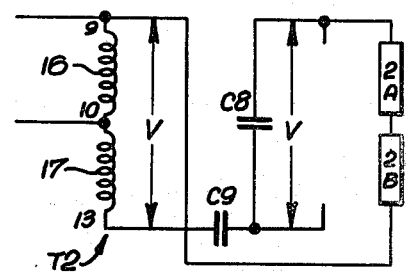
Figure 4B:
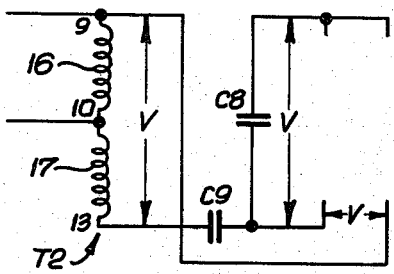
Figure 4D:
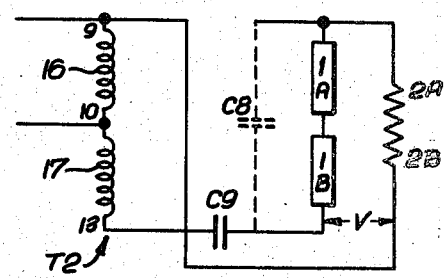

Since the lamps 1A and 1B are effectively bipassed by the capacitor C8 when the circuit is first turned on, the entire voltage of the secondary 17 of the main power transformer T2 is employed to turn on the lamps 2A and 2B, as depicted in FIG. 4c. Because of the negative resistance characteristics of electric discharge lamps, the voltage drop across the lamps 2A and 2B becomes very low immediately after those lamps are started. As a consequence, practically all the voltage from the secondary 17 of the main power transformer T2 is then available to start the lamps 1A and 1B. At this time the equivalent circuit for the lamps is as depicted in FIG. 4(d) after the lamps 2A and 2B are started but before the lamps 1A and 1B are started. Because of the high impedance of the capacitor C8, the capacitor C8 is effectively removed from the circuit so that nearly all of the voltage produced across the secondary 17 is available to start the lamps 1A and 1B.

Once the four lamps have been started, their connection is in series and the capacitor C8 is effectively out of the circuit because of its high impedance. The current through the lamps 1A, 1B, 2A and 2B rapidly increases until reaching a steady state. This steady state current is a function of the capacitance reaction of the operating capacitor C9.

With the transformer of FIG. 1, the lamps 1A, 1B, 2A and 2B are operated at their nominal voltage for which they are designed once they have been started. This assures a normal lamp life. A further feature of the invention is that since the lamps are started in separate sequences, the number of turns in the secondary 17 of the main power transformer T2 can be reduced to the minimum, thus insuring the least possible reflected impedance to the inverter 20. This reduces the loss in efficiency in a quadratic fashion, as previously explained.

Preferably, circuit values associated with the output of the transformer T2 are as follows: C8 = 120 picofarads, $X_C$ = 36,841 ohms; C9 = 6,600 picofarad, $X_{C9}$ = 670 ohms; frequency = 36 kilohertz. The voltage output of secondary 17 of transformer T2 is 520 volts a.c.

The feature of cathode feeding is depicted in FIG. 1. As previously noted, in conventional systems cathode feeding is from the main power transformer, and the turns ratio does not allow the exact voltage required by the lamp to be provided in order to achieve normal lamp performance. To overcome this shortcoming, an auxiliary transformer T3 is interposed between the cathode elements of the lamps 1A, 1B, 2A and 2B and the secondary 18 of the main power transformer T2. The auxiliary transformer T3 is a small transformer which by means of an auxiliary winding 18 on the main power transformer T2 draws only a fraction of the voltage therefrom onto the primary winding 44 of the auxiliary transformer T3. The winding 44 of the auxiliary transformer T3 serves as the primary of that transformer. A reduced voltage in the primary 44 can be achieved by a ratio of one volt per turn or less. The exact voltage for cathode feeding is achieved by the number of turns of the windings on each of the secondaries 46, 48, 50, 52 and 54. The proper voltage on these windings is essential to keep the necessary heat in the cathodes of the lamps 1A, 1B, 2A and 2B during lamp operation, thereby assuring a normal lamp life.

Figure 6:
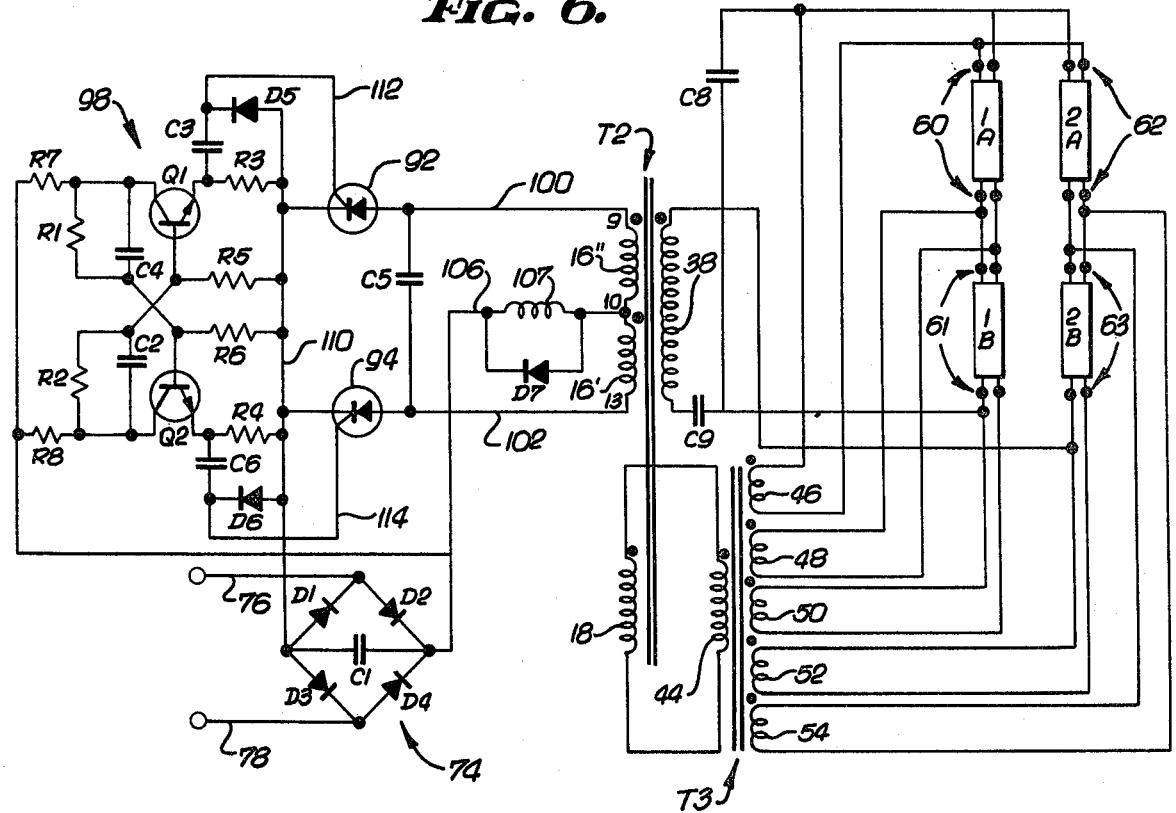
FIG. 6 is an electrical diagram which shows an embodiment of the invention in which an SCR switching circuit is employed and controlled by a multivibrator.
Figure 5:
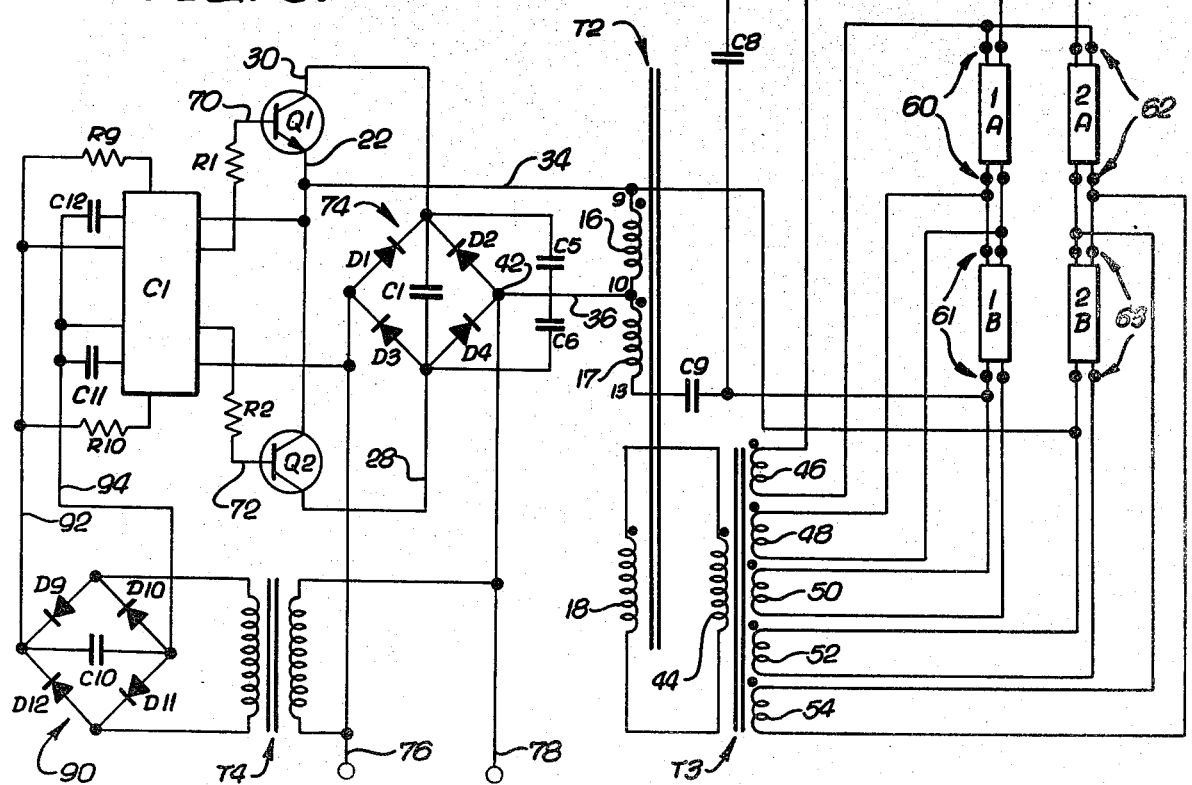
FIG. 5 illustrates an alternative embodiment of the invention wherein an externally excited oscillator circuit is utilized.

It should be understood that several modifications of the invention are possible, and some are depicted in FIGS. 5–7, with corresponding components bearing the same reference designations as in FIG. 1. For example, the full wave bridge rectifier could be removed and the system operated directly from a direct current voltage supply. Such a modification is contemplated in FIG. 2 of U.S. patent application Ser. No. 55,239, referred to above.

The circuit of FIG. 1 has several significant advantages with respect to other ballast designs. Specifically, the feedback transformer T1 is a small transformer that has a square hysteresis loop core and is permitted to saturate and determine the half period of the inverter 20. Since the main power transformer T2 does not saturate, in the embodiment of FIG. 1, there is no high current spike at the end of each conducting half cycle. Efficiency is thereby improved and the possible destructive stresses on the power transistors are avoided. Also, the total flux excursion in the main power transformer T2 can be reduced in the embodiment of FIG. 1, as contrasted with other ballasting systems to a considerably lower value than the saturation flux density, and preferably about half that value.

Since core loss varies roughly as $B_{max}^{1.6}$, the operation of transformer T2 at a peak flux density of one half its saturation value will reduce core losses by a factor of about three. The feedback transformer T1 has a much smaller core than the main power transformer T2. Since it needs only to supply much lower currents to the bases of the transistors Q1 and Q2, its core losses are insignificant.

Another advantage of a circuit employing a feedback transformer T1 is that a potentiometer may be substituted for the capacitor C7 in the connection to the secondary winding L4. This potentiometer may be an adjustable potentiometer to afford a simple means for varying the operating frequency, and thus adjusting the brightness of illumination of the lamps 1A, 1B, 2A and 2B.

A further advantage of the embodiment of FIG. 1 relative to other electronic ballasts is that the applied voltage across the inverter transistors Q1 and Q2 is reduced from two times the power source voltage to one times the voltage. This is because the transistors in other electronic ballasts Q1 and Q2 are connected in push-pull fashion but they are connected in series in FIG. 1.

The circuit of FIG. 5 is similar in operation to that of FIG. 1 with the primary difference being that an integrated circuit oscillator C1 has been substituted for the feedback control of the transistors Q1 and Q2. A separate full wave rectifier 90 is employed for the multivibrator C1 and is connected to the d.c. supply lines 76 and 78 through a step down transformer T4. The full wave rectifier 90 employs diodes D9-D12 and a filtering capacitor C10. The rectifier 90 serves as a drive inverter and the transformer T4 operates in its linear region. This decreases significantly losses by hysteresis and the problem of high current spikes which occurred in prior devices.

The integrated circuit oscillator C1 is coupled to the d.c. output leads 92 and 94 of the rectifier 90 through capacitors C11 and C12 and resistors R9 and R10 as indicated. Outputs to the bases of the transistors Q1 and Q2 are provided through resistors R1 and R2 respectively. The oscillator or multivibrator C1 thereby obviates the problem of collector current spikes by rendering the drive to the bases 70 and 72 of the transistors Q1 and Q2 independent of any residual drive from the capacitors C2 and C3, depicted in FIG. 1. These capacitances are eliminated, since the forward bias to the transistors Q1 and Q2 is provided independent of any residual drive from the capacitors C2 and C3, depicted in FIG. 1. These capacitors are eliminated, since the forward bias to the transistors Q1 and Q2 is provided entirely through the oscillator multivibrator C1.

The configuration of FIG. 6 is for types of lamps which operate on the principal of "instant start". That is, "instant start" start without preheated cathodes based upon an initial high voltage. This output is for slimline lamps, without cathode feeding because they work with cold cathodes. Thus, these lamps function without the necessity of connections from the auxiliary transformer T3. While these connections remain in place so that the ballasting system can be utilized for other types of lamps, the current from the secondaries 46, 48, 50, 52 and 54 of the auxiliary transformer T3 is virtually ignored.

FIG. 6 shows an inverter with thyristors 92 and 94, such as silicon controlled rectifiers. Both thyristors 92 and 94 are connected to the main power transformer T2′. These thyristors are alternatively discharged taking them to the "on" state, by means of the gate source of triggering pulses which is the multivibrator 98 formed by transistors Q1 and Q2 and the polarization network, including resistors R5 and R6, and the timing network, including resistors R1, R2, and capacitors C2 and C4. This produces the alternating current in the main power transformer T2′. The thyristors 92 and 94 are switched by capacitors C5′, which is connected between the anodes of thyristors 92 and 94. The electron circulation through the circuit can be easily followed if it supposed that thyristor 92 is initially conducting and thyristor 94 is "off". The cathodes common connection of the thyristors 92 and 94 is the reference point which is negative d.c. supply line 110. For this condition, the voltage in the anode of thyristor 94 is twice the voltage of the feeding source, namely the voltage delivered by the rectifier bridge 74. The electron flow circulates from the rectifier bridge 74, through the thyristor 92, through line 100, through one half of the primary winding of transformer T2 indicated at 16″, and back to the positive d.c. supply line 106. When triggering current is applied to the gate of thyristor 94 on line 114 it is turned "on" and conducts.

During the thyristor 94 "on" period, capacitor C5′ starts discharging through thyristors 92 and 94. The discharge election flow through thyristors 92 circulates in an inverted direction and after the carriers are swept and recombined, thyristor 92 is open, passing to the "off" state. At this moment, the existing voltage across capacitor C5′ is approximately twice the voltage of the bridge 74, but at this time it has opposite polarity and appears through thyristor 92 as an inverted voltage. This voltage remains a sufficient period of time to allow the thyristor 92 to shut off. Simultaneously, within this period of time, thyristor 94 is in an "on" state, and establishes another discharge path via capacitor C5′ through the half 16′ of the primary of transformer T2′ and inductor 107. The function of inductor 107 is to control the discharge rate of capacitor C5′ in order to have enough time to switch off the thyristor which is on.

After the voltage across capacitor C5′ has been reduced from twice the voltage of the rectifier 74 to the same voltage as the rectifier 74, with inverter polarization, the capacitor C5′ starts charging in the opposite direction up to twice the voltage of the source. When this has occured, due to the phase inversion between voltage and current, the flux of the inductor 107, is at that moment maximized. When triggering current is applied to gate of thyristor 92, this device conducts and repeats the above described process.

Every time that the thyristors 92 and 94 are switched "off" to interrupt the reversal of current, a certain quantity of energy remains in the magnetic field of inductor 107. This energy is also present in the distributed capacitance of the inductor 107, which is relatively small, and generates in this way a high voltage transitory. This transitory can exceed the limits of the system, producing undesired stresses and increasing the switching dissipation. By means of the suppressor diode D7, this transitory voltage is avoided.

The secondary 38 of the main power transformer T2′ is connected in series with the lamp load and with operating capacitor C9, and functions in the same manner as the main power transformer T2 in FIG. 1.

It is significant that according to the present invention, no inductive component is required in series with the main power transformer primary or secondary to feed the lamp load. This reduces the necessary power required and likewise reduces reflection of impedance back into the inverter. Also, the inverter of the invention includes no resistive elements in the main current path so that there is no ohmic disappation. Rather, initial electron flow in the inverter circuit, with reference to the embodiment of FIG. 1, is through the main power transformer primary 16, the tap 36, the capacitor C6, line 28 and transistor Q2 to line 34. Similarly, and on alternative half cycles, current flow is in the opposite direction through primary winding 16 of main power transformer T2 through the transistor Q1 to line 26 and through capacitor C5 to line 36. No inductive nor resistive loads are in circuit in this current path. Accordingly, the load on the inverter circuit is minimized, as is the power consumption of the entire ballasting system 11. Also, the transistors Q1 and Q2 in the preferred embodiment of FIG. 1 in the present invention are series connected. As contrasted with a common emitter connection, the series connection of the transistors reduces the applied voltage across the inverter transistors Q1 and Q2 from twice the power supply to one time the power supply voltage. Accordingly, less expensive transistors can be utilized.

Undoubtedly numerous variations and modifications of the invention will become readily apparent to those familiar with electronic ballasting systems. Accordingly, the scope of the present invention should not be limited to the specific embodiments depicted, but rather is defined in the claims appended hereto.

I claim:

1. An electronic ballasting system for illuminating electrical lamps comprising:

a main power transformer having a primary winding and at least a first secondary winding, an electronic inverter coupled to drive current through said main power transformer primary winding sequentially in alternating directions characterized in that said electronic inverter has first and second transistors with the emitter of said first transistor coupled to the collector of said second transistor, and further comprising a pair of d.c. supply lines, one of which is coupled to the collector of said first transistor and the other of which is coupled to the emitter of said second transistor, a pair of charging capacitors series connected across said d.c. supply lines each coupled to at least partially turn on a single one of said transistors, a lead connecting said emitter of said first transistor to said main power transformer primary winding, and a lead connecting said main power transformer primary winding to a tap between said charging capacitors, means for driving said transistors in alternating sequence, a starting circuit for initially driving said electronic inverter and further characterized in that said starting circuit initially drives one of said transistors, an operating capacitor connected to said main power transformer first secondary winding, at least first and second lamp terminal means for receiving electrical discharge lamps having cathode elements therein, said lamp terminal means being series connected to said operating capacitor and to said main power transformer first secondary winding, and a high impedance capacitor connected in parallel across at least one and less than all of said terminal means.

2. An electronic ballasting system according to claim 1 further comprising a second secondary winding of said main power transformer and an auxiliary transformer having a primary winding coupled to said second secondary winding of said main power transformer and stepped down therefrom, and having secondary windings stepped down from said auxiliary transformer primary windings and coupled to said lamp terminal means for heating cathode elements in lamps positioned therein.

3. An electronic ballasting system according to claim 1 in which said main power transformer also includes a feedback secondary winding and further comprising a feedback transformer smaller than said main power transformer and having a primary winding coupled to said feedback secondary winding of said main power transformer and having secondary winding means coupled to operate said electronic inverter.

4. An electronic ballasting system according to claim 3 further characterized in that said feedback transformer is saturated at a lower flux than said main power transformer and operates said electronic inverter to reverse the direction of current in said main power transformer primary winding each time said feedback transformer is saturated without saturating said main power transformer.

5. An electronic ballasting system according to claim 3 in which said main power transformer is an autotransformer and said primary winding of said main power transformer is coupled in series with said first secondary winding of said main power transformer.

6. An electronic ballasting system according to claim 1 further characterized in that said means for driving said transistors in alternating sequence includes a third secondary winding on said main power transformer coupled to alternately drive the bases of said first and second transistors.

7. An electronic ballasting system according to claim 6 further comprising a feedback transformer having a primary winding coupled to said third secondary winding of said main power transformer and having dual feedback secondary windings, each respectively connected in circuit between the emitter and the base of separate ones of said transistors.

8. An electronic ballasting system according to claim 7 further comprising an adjustable potentiometer in series with said primary winding of said feedback transformer and said third secondary winding of said main power transformer.

9. An electronic ballasting system according to claim 1 further characterized in that said means for driving said transistors in alternating sequence and said starting circuit are formed by an integrated circuit oscillator means with separate output leads coupled to the bases of each of said transistors.

10. An electronic ballasting system according to claim 1 further comprising a full wave rectifying bridge with input lines coupled to a.c. supply lines and with said d.c. supply lines as outputs.

11. An electronic ballasting system according to claim 1 further characterized in that said starting circuit includes a diac coupled to one of said d.c. supply lines and to the base of one of said transistors.

12. An electronic ballasting system according to claim 1 further characterized in that said inverter includes a counterphase oscillator means having output leads connected to said primary winding of said main power transformer and a multivibrator with outputs of opposite and reversible polarity, and separate thyristors with gates coupled to each of said multivibrator outputs and coupled in circuit to said output leads of said counterphase oscillator means.

* * * * *